Dec. 16, 1924.   1,519,967
A. M. HUGHES
PNEUMATIC BUMPER
Filed May 19, 1924
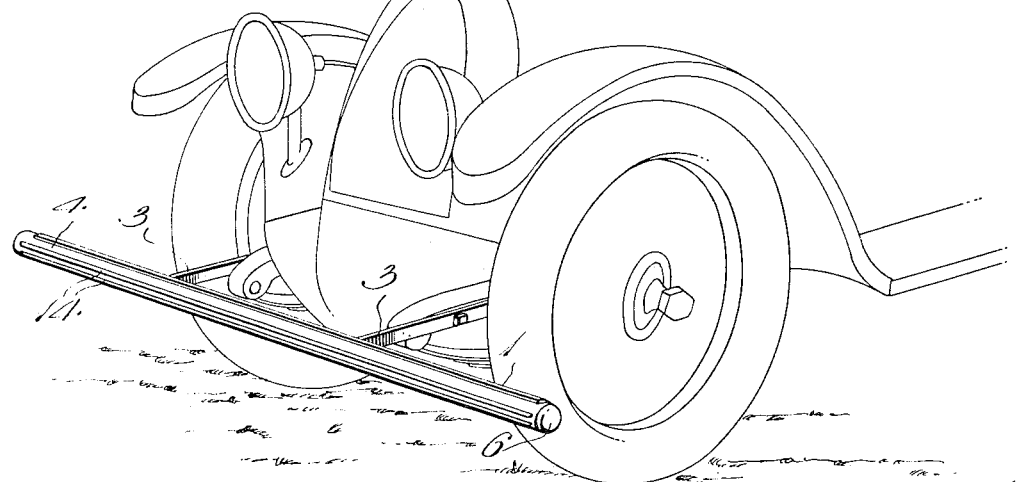
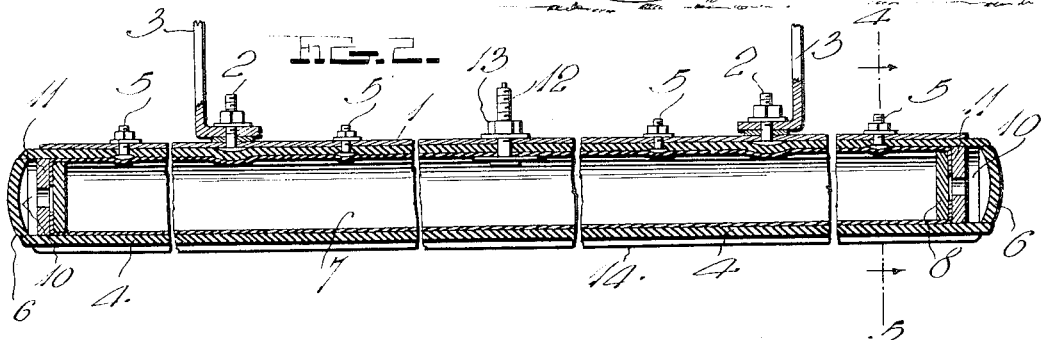
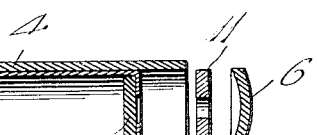
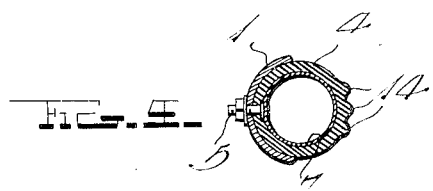
Inventor
A. M. Hughes
Witness
H. Woodard
By H. B. Willson & Co
Attorneys Patented Dec. 16, 1924.

1,519,967

UNITED STATES PATENT OFFICE.

ALBERT M. HUGHES, OF PASADENA, CALIFORNIA.

PNEUMATIC BUMPER.

Application filed May 19, 1924. Serial No. 714,434.

*To all whom it may concern:*

Be it known that I, ALBERT M. HUGHES, a citizen of the United States, residing at Pasadena, in the county of Los Angeles and State of California, have invented certain new and useful Improvements in Pneumatic Bumpers; and I do declare the following to be a full, clear, and exact description of the invention, such as will enable others skilled in the art to which it appertains to make and use the same.

My invention relates to improvements in automobile bumpers. As now constructed, bumpers are formed either of rigid metal and are resiliently connected with the machine, or they are formed of spring metal. While these bumpers are more or less efficient in absorbing shocks when one machine strikes another or some other object, serious scratching of enamel on a car with which the bumper has come in contact usually results.

It is the object of my invention to provide a pneumatic bumper of novel construction which will be efficient as a shock absorber, whether its extremities or its intermediate portion come in contact with any object, and the construction is such as to prevent marring the finish of another machine, if struck thereby.

With the foregoing in view, the invention resides in the novel subject matter hereinafter described and claimed, the description being supplemented by the accompanying drawing.

Figure 1 is a perspective view of the improved bumper applied to an automobile.

Figure 2 is a horizontal sectional view.

Figure 3 is a detail sectional view prior to complete manufacture of the device.

Figure 4 is a transverse sectional view as indicated by line 4—4 of Fig. 2.

The drawing above briefly described, illustrates the preferred form of construction and while such construction has been specifically described hereinafter, it is to be understood that within the scope of the invention as claimed, modifications may be made.

The numeral 1 designates a channel-shaped back bar through which a pair of flat-headed bolts 2 pass rearwardly, said bolts being adapted to secure the bar to appropriate brackets 3 carried by the machine to which the bumper is to be applied. A tubular, heavily constructed, yieldable casing 4 has its rear portion received in the channel of the bar 1 and short flat-headed bolts 5 are passed rearwardly through the rear wall of said casing and the bar to secure them together. This casing is preferably formed of fibre and rubber, in much the same manner as automobile tire casings are constructed. The ends of the casing project beyond the bar 1 and are tightly sealed by concavo-convex end members 6 which are cemented or vulcanized therein, with their convex sides disposed outwardly.

Within the casing 4, is an inner tube 7, into whose ends, comparatively stiff end members 8 are inserted, said end members being preferably of the same material as the casing 4. The ends of the tube are turned inwardly around the end members 8 and cemented or vulcanized thereto, providing air-tight closures for the tube. The end members 8 are spaced inwardly from the concavo-convex end members 6 of the casing 4, to provide air pockets 10, and to limit the outward movement of the tube ends toward said end members 6, suitable abutments, such as the rings 11, are cemented or vulcanized in the end portions of the casing 4, in inwardly spaced relation with the members 6, said rings 11 being by preference of the same materials as the several end members and the casing.

An inflation valve 12 projects rearwardly through the tube 7, the casing 4 and the bar 1 and is preferably provided with a clamping nut 13. When the tube is inflated by means of this valve and a suitable supply of air pressure, its ends are tightly seated against the inner sides of the abutment rings 11, as shown in Fig. 2, and it will be seen that if either end of the bumper should strike another machine, it will yield inwardly and not only will the air in the pockets 10 act as cushions, but this air will compress to some extent and re-act against the ends of the tube, thus effectively absorbing the shock. Furthermore, as the ends of the casing are yieldable, no scratching will result, if they come in contact with another machine. If any of the intermediate portion of the bumper strikes an object, the tube 7 will obviously absorb the shock very effectively. If desired, the front wall of the casing 4 may be reinforced, for instance by a plurality of ribs 14 which protect said casing to a large extent against injury.

By reference to Figs. 2 and 3, the manner of assembling the device will be clear. After the bar 1 has been bolted to the casing 4, and the bolts 2 have been passed through said bar, the tube 7 may be inserted, the ends of this tube having been previously sealed. Then, the abutment rings 11 are inserted into the ends of the casing and cemented or vulcanized in place, and finally the concavo-convex end members 6 are inserted into the casing ends and similarly secured.

The device is simple and inexpensive, but on account of its highly resilient qualities and the absence of metal at the front and ends, it will be very efficient and greatly advantageous over the common metal bumpers.

I claim:

1. A pneumatic bumper comprising a tubular yieldable casing having concavo-convex yieldable end members tightly sealing its ends, a pneumatic tube in said casing having comparatively stiff end members spaced inwardly from said concavo-convex end members to provide air pockets, and abutments secured in the end portions of said casing to limit the outward movement of the tube ends.

2. A pneumatic bumper comprising a tubular yieldable casing having concavo-convex yieldable end members tightly sealing its ends, a pneumatic tube in said casing having comparatively stiff end members spaced inwardly from said concavo-convex end members to provide air pockets, and abutment rings secured in the end portions of said casing to limit the outward movement of the tube ends.

3. A pneumatic bumper comprising a channel-shaped back bar, flat-headed bolts passing rearwardly through said bar for securing it to a machine, a yieldable tubular casing whose rear portion is received in the channel of said bar, said casing projecting beyond the ends of said bar and having yieldable end members, flat-headed bolts passing rearwardly through the rear side of the casing and through said bar to secure them together, an inner tube in said casing, and an inflation stem for said tube projecting rearwardly through the casing and bar.

In testimony whereof I have hereunto affixed my signature.

ALBERT M. HUGHES.